Figure 1:
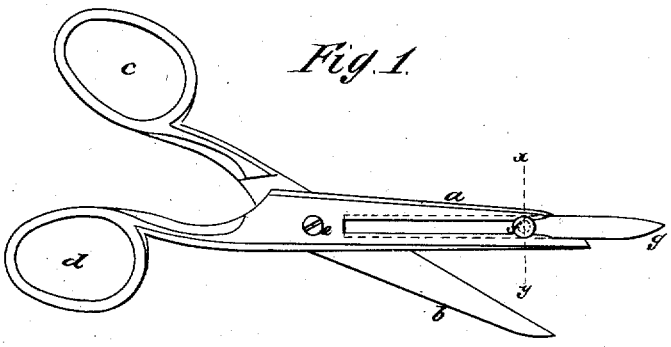

C. M. JOHNSON.

Scissors.

No. 6,089. Reissued Oct. 20, 1874.

Witnesses:
A. L. McArthur Jr
Jacob Feuel

Inventor:
C. M. Johnson
By atty,
J. McArthur

THE GRAPHIC CO. PHOTO-LITH. 39 & 41 PARK PLACE, N.Y.

UNITED STATES PATENT OFFICE.

CAMILLUS M. JOHNSON, OF NEW YORK, N. Y.

IMPROVEMENT IN SCISSORS.

Specification forming part of Letters Patent No. 146,457, dated January 13, 1874; reissue No. 6,089, dated October 20, 1874; application filed October 6, 1874.

*To all whom it may concern:*

Be it known that I, CAMILLUS M. JOHNSON, of New York, in the county of New York and State of New York, have invented certain new and useful Improvements in Combined Knife and Scissors; and I do hereby declare that the following is a full, clear, and exact description thereof, whereby a person skilled in the art can make and use the same, reference being had to the accompanying drawings, and to the letters of reference marked thereon.

Previous to my invention it has been suggested to combine with one of the blades of a pair of scissors a knife-blade, in order that one implement or instrument might be rendered capable of serving separately the purposes of both a knife and a pair of scissors; but in the suggested construction of such a combined knife and scissors the knife-blade was hinged or pivoted to the larger of the two scissor-blades after the fashion of the blade of a pen-knife, the scissor-blade being hollowed out and made with a cover-plate or separate side piece, so that the knife-blade could be opened out of and turned down into the scissor-blade in the manner that the blade of a pen-knife is opened out from and shut down into the handle.

An implement constructed upon this plan or principle embraces objections which nearly or quite overbalance the advantages of the combination of the two instruments in one, and which have rendered it comparatively useless in a practical and commercial sense.

In the first place, the complication and consequent cost of manufacture of the article in a great measure destroys its supposed utility; and in the second place (even if made in a workmanlike manner) the liability to get out of order—by the wear of the joint, weakening of the spring, wear of the bearing-shoulders, &c.—renders the implement an undesirable article of manufacture and sale.

I propose by my invention to overcome the evils embraced in a combined knife and scissors, and afford an implement which, while it is capable of efficiently serving the double purpose alluded to, shall be perfectly durable, economic of manufacture, and not liable, during long use, to any derangement of its parts, or any wear which will render them at all inoperative; and to these ends and objects my invention consists in an implement adapted to serve both the purposes of a knife and a pair of scissors, and formed by the combination, with a pair of scissors, of a knife-blade, so arranged with one of the blades of the scissors that it can be pushed or drawn out into a convenient position for use when needed, and can be slid back out of the way when not wanted, as will be hereinafter more fully explained.

To enable those skilled in the art to make and use my improved combined knife and scissors, I will proceed to more fully describe the construction and operation of the implement, referring by letters to the accompanying drawings, in which—

Figure 2:
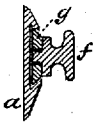

Figure 1 is a side view or elevation, showing the knife-blade adjusted for use; and Fig. 2 is a detail cross-section at the line *y y*, Fig. 1.

In the several figures, *a* and *b* are the blades of the scissors, and *c d* the handles. The blade *a* is the larger and thicker of the two, and has cut or formed in it a groove or seat, *e e*, in which is arranged, so as to slide freely endwise, the rear end or shank portion of the knife-blade *g*. This shank portion of the knife *g*, as will be seen by reference to Fig. 2, is slightly dovetailing in cross-section, as is also the groove or seat *e e*, in which it slides. *f* is a clamping-screw for holding the knife-blade in any desired position endwise.

The operation will be understood to be as follows: When it is desired to use the knife *g*, it is slid or pushed endwise, so as to have its cutting-edge protrude or project beyond the end of the blade *a* of the scissors, as seen at Fig. 1, and is there secured or held fast by the clamping-screw *f*, which is slightly turned to effect this end.

When it is desired to throw the knife into disuse, or put the blade *g* out of the way, so as to permit the ready use of the shear or scissor blade, the holder-screw *f* is slightly loosened and the blade *g* slid backward into its seat or housing in the blade *a*, where it may be reclamped, if necessary, by a slight turn of the screw *f*.

It will be seen that by the simple contrivance of the dovetail form of knife-shank *g* and recess or slot *e e*, I am enabled to draw the parts to a perfect taper-bearing always by simply turning the clamping-screw *f*, and that by this mode of holding the parts in adjustment a perfectly-rigid retention of the knife *g* and blade *a* together will always be effected during long use of the instrument.

The scissors may, of course, be made in any ordinary manner and of any desired size and design, and the ends of the slot in which the knife *g* slides may be closed over or stopped in any usual manner.

In lieu of the taper or dovetail-like bearing of the knife-blade shank in the slot *e e* and the clamping-screw *f* as a means of effecting the retention of the parts in adjustment, this end may be accomplished by other means without departing from or losing the advantages of the other part of my invention.

Having so fully explained the construction and operation of my improved combined knife and scissors that any one skilled can make and use the same, what I claim therein as new, and desire to secure by Letters Patent, is—

1. In combination with one of the blades of a pair of scissors, a sliding knife-blade, substantially in the manner and for the purpose described.

2. In such a combination, the taper-bearing form of the slot *e e* and knife-blade shank, and a suitable clamping-screw, as and for the purpose set forth.

In testimony whereof I have hereunto set my hand and seal.

CAMILLUS M. JOHNSON. [L. S.]

In presence of—
G. H. ALEXANDER,
J. N. MCINTIRE.